United States Patent
Yang et al.

(10) Patent No.: US 10,305,978 B2
(45) Date of Patent: May 28, 2019

(54) METHOD AND APPARATUS FOR SYNCHRONIZING WEBPAGE INFORMATION

(71) Applicant: TENCENT TECHNOLOGY (SHENZHEN) COMPANY LIMITED, Shenzhen (CN)

(72) Inventors: Yanshao Yang, Shenzhen (CN); Dujuan Huang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 445 days.

(21) Appl. No.: 14/634,620

(22) Filed: Feb. 27, 2015

(65) Prior Publication Data
US 2015/0180973 A1   Jun. 25, 2015

Related U.S. Application Data

(63) Continuation of application No. PCT/CN2013/081731, filed on Aug. 19, 2013.

(30) Foreign Application Priority Data

Aug. 29, 2012 (CN) .......................... 2012 1 0311628

(51) Int. Cl.
  *H04L 29/06* (2006.01)
  *H04L 29/08* (2006.01)
  *G06F 16/954* (2019.01)

(52) U.S. Cl.
  CPC ........ *H04L 67/1095* (2013.01); *G06F 16/954* (2019.01); *H04L 67/02* (2013.01); *H04L 67/1097* (2013.01); *H04L 67/306* (2013.01); *H04L 67/42* (2013.01)

(58) Field of Classification Search
  None
  See application file for complete search history.

(56) References Cited

U.S. PATENT DOCUMENTS 8,898,297 B1 * 11/2014 Taylor ............... G06F 17/30867
  707/706
8,938,422 B1 * 1/2015 Liu ..................... H04L 67/1095
  707/628

(Continued)

FOREIGN PATENT DOCUMENTS

CN  1912869 A    2/2007
CN  102638581 A  8/2012

(Continued)

OTHER PUBLICATIONS

International Search Report dated Nov. 21, 2013 re: Application No. PCT/CN2013/081731; citign: CN 102638581 A, CN 102664932 A, CN 102737121 A, CN 1912869 A and US 2003/0195963 A1.

(Continued)

*Primary Examiner* — Azizul Choudhury
(74) *Attorney, Agent, or Firm* — Morgan, Lewis & Bockius LLP

(57) ABSTRACT

According to an example, a cloud server receives an upload request transmitted by the first terminal, wherein the upload request comprises an account and webpage information of a webpage displayed on a first browser of the first terminal. The cloud server transmits the webpage information of the webpage to the second terminal according to the account, such that a second browser of the second terminal opens the webpage according to the webpage information.

14 Claims, 4 Drawing Sheets

(56) References Cited

U.S. PATENT DOCUMENTS

| | | | |
|---|---|---|---|
| 9,065,827 B1* | 6/2015 | Taylor | H04L 63/10 |
| 2002/0035603 A1* | 3/2002 | Lee | G06F 17/30873 |
| | | | 709/205 |
| 2003/0195963 A1 | 10/2003 | Song et al. | |
| 2008/0282198 A1* | 11/2008 | Brooks | G06Q 10/10 |
| | | | 715/854 |
| 2009/0222716 A1* | 9/2009 | Boerries | G06F 17/30884 |
| | | | 715/206 |
| 2010/0017385 A1* | 1/2010 | Wilcox | G06F 17/30884 |
| | | | 705/1.1 |
| 2012/0209841 A1* | 8/2012 | Saretto | G06F 17/218 |
| | | | 707/736 |
| 2012/0260192 A1* | 10/2012 | Detweiler | G06Q 30/02 |
| | | | 715/745 |
| 2013/0080765 A1* | 3/2013 | Mohanty | H04L 63/0428 |
| | | | 713/150 |
| 2013/0332856 A1* | 12/2013 | Sanders | G06F 3/0481 |
| | | | 715/753 |
| 2014/0025727 A1* | 1/2014 | Ahn | H04L 67/1095 |
| | | | 709/203 |
| 2014/0052868 A1* | 2/2014 | Burckart | G06F 17/30873 |
| | | | 709/227 |

FOREIGN PATENT DOCUMENTS

| | | |
|---|---|---|
| CN | 102664932 A | 9/2012 |
| CN | 102737121 A | 10/2012 |
| WO | 2004088543 A1 | 10/2004 |
| WO | 2010148762 A1 | 12/2010 |

OTHER PUBLICATIONS

European Search Report dated Jul. 23, 2015 re: Application No. EP 13 83 2431; pp. 1-8; citing: Song et al.: "Browser State . . . ", Adeyeye t al. "A SIP-based web . . . ", WO 2010/148762 A1 and WO 2004/088543 A1.

Henry Song et al. "Browser State Repository Service", Lecture Notes in Computer Science, Jan. 1, 2002, vol. 2414, pp. 253-266.

International Preliminary Report on Patentability and Written Opinion dated Mar. 12, 2015 re: Application No. PCT/CN2013/081731; pp. 1-9; citing: CN102638581 A.

Michael Adeyeye et al. "SIP-based web client for HTTP session mobility and multimedia services", Computer Communications, May 1, 2010, vol. 33, No. 8, pp. 954-964.

* cited by examiner

METHOD AND APPARATUS FOR SYNCHRONIZING WEBPAGE INFORMATION

CROSS REFERENCE TO RELATED APPLICATIONS

This application is a continuation application of International Patent Application No. PCT/CN2013/081731 filed on Aug. 19, 2013, which claims the benefit of Chinese Patent Application No. 201210311628.4, filed on Aug. 29, 2012, the disclosure of which is incorporated herein in its entirety by reference.

FIELD OF THE INVENTION

The present invention relates to Internet communications techniques, and more particularly, to a method and an apparatus for synchronizing webpage information.

BACKGROUND OF THE INVENTION

With the rapid development of browser techniques, browsers have been widely used by most users. A user may browse a webpage using a browser. Or, the user may collect a webpage into his favorites when browsing the webpage, such that the webpage may be opened rapidly when the user wants to browse the webpage next time.

At present, a user may have multiple terminals. At a first time, the user browses a webpage and collects the webpage in his favorites on one terminal. At a second time, the user may want to browse the webpage on another terminal. For example, the user browses a webpage and collects the webpage in his favorites on a computer in the office. When going back to home, the user may want to browse the webpage on a computer at home. At this time, the user has to find the webpage on the Internet again, which is inconvenient for the user to browse the webpage.

SUMMARY OF THE INVENTION

Examples of the present invention provide a method and an apparatus for synchronizing webpage information.

According to an example of the present disclosure, a method for synchronizing webpage information between a first terminal and a second terminal is provided. The method includes:

receiving, by a cloud server, an upload request transmitted by the first terminal, wherein the upload request comprises an account and webpage information of a webpage displayed on a first browser of the first terminal; and transmitting, by the cloud server, the webpage information of the webpage to the second terminal according to the account, such that a second browser of the second terminal opens the webpage according to the webpage information.

According to another example of the present disclosure, a cloud server for synchronizing webpage information between a first terminal and a second terminal is provided. The cloud server includes: a processor and a memory; wherein the memory is communicatively connected with the processor and stores machine-readable instructions executable by the processor to:

receive an upload request transmitted by the first terminal, wherein the upload request comprises an account and webpage information of a webpage displayed on a first browser of the first terminal; and transmit the webpage information of the webpage to the second terminal according to the account, such that a second browser of the second terminal opens the webpage according to the webpage information.

According to still another example of the present disclosure, a non-transitory computer-readable storage medium comprising a set of instructions for synchronizing webpage information between a first terminal and a second terminal is provided, the set of instructions to direct at least one processor to perform acts of:

receiving an upload request transmitted by the first terminal, wherein the upload request comprises an account and webpage information of a webpage displayed on a first browser of the first terminal; and transmitting the webpage information of the webpage to the second terminal according to the account, such that a second browser of the second terminal opens the webpage according to the webpage information.

In the method and apparatus provided by the examples of the present disclosure, the first terminal obtains the webpage information of the webpage and transmits the account and the webpage information to the cloud server. The cloud server transmits the webpage information to the second terminal corresponding to the account. The second terminal receives the webpage information transmitted by the cloud server. Thus, when a user wants to browse the webpage on the second terminal, the user is able to open the webpage directly according to the webpage information, which is convenient for the user to browse the webpage.

DETAILED DESCRIPTION OF THE INVENTION

The present disclose will be described in further detail hereinafter with reference to accompanying drawings and examples to make the technical solution and merits therein clearer.

For simplicity and illustrative purposes, the present disclosure is described by referring to examples. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure. As used herein, the term "includes" means includes but not limited to, the term "including" means including but not limited to. The term "based on" means based at least in part on. In addition, the terms "a" and "an" are intended to denote at least one of a particular element.

In an example of the present disclosure, a user logs on a cloud server respectively via a first terminal and a second terminal using the same account. The cloud server receives an upload request transmitted by the first terminal, wherein the upload request carries the account of the user and webpage information of a webpage displayed on a first browser of the first terminal. The cloud server transmits the webpage information of the webpage to the second terminal according to the account carried in the upload request. Thus, when the user wants to browse the webpage on the second terminal, the user can open the webpage on a second browser of the second terminal directly according to the webpage information transmitted by the cloud server, which is convenient for the user to browse the webpage on the second terminal.

Figure 1:
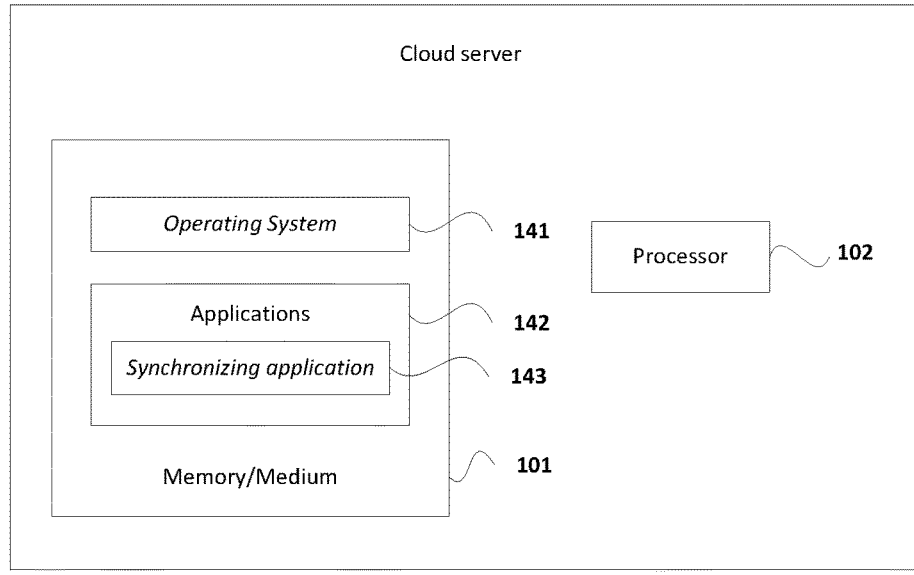
FIG. 1 is a schematic diagram illustrating a cloud server for synchronizing webpage information according to an example of the present disclosure.

FIG. 1 is a schematic diagram illustrating an example of a cloud server which may execute the method of the present disclosure. The cloud server may vary in terms of capabilities or features. As shown in FIG. 1, the cloud server may include one or more non-transitory processor-readable storage media 101, one or more processors 102 in communication with the non-transitory processor-readable storage media 101. The cloud server may further include a display and/or a keyboard.

For example, the non-transitory processor-readable storage media 101 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 101 may store sets of instructions, or units and/or modules that comprise the sets of instructions, for conducting operations described in the present application.

The one or more non-transitory processor-readable storage media 101 may include or may execute a variety of operating systems 141, including an operating system. The one or more non-transitory processor-readable storage media 101 may also include or may execute a variety of possible applications 142, such as a synchronizing application 143 executable by a processor to implement the methods provided by the present disclosure.

The one or more processors 102 may be configured to execute the sets of instructions and perform the operations in examples of the present application.

Figure 2:
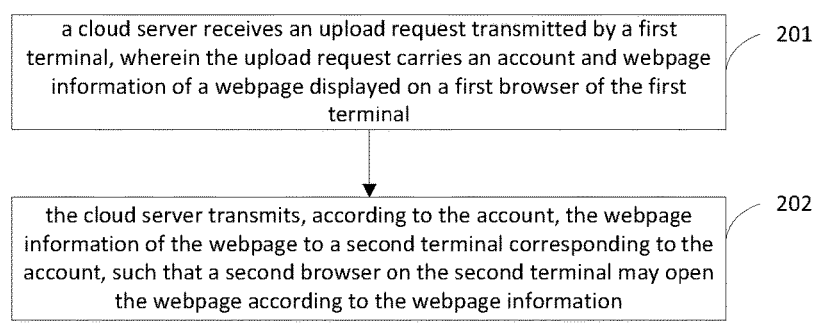
FIG. 2 is a flowchart illustrating a method for synchronizing webpage information according to an example of the present disclosure.

FIG. 2 is a flowchart illustrating a method for synchronizing webpage information according to the first example of the present disclosure. FIG. 2 is a simplified diagram according to an example of the present invention. This diagram is merely an example, which should not unduly limit the scope of the claims. One of ordinary skill in the art would recognize many variations, alternatives, and modifications.

In this example, a user logs on a cloud server respectively via a first terminal and a second terminal using the same account, so as to synchronize webpage information between the first terminal and the second terminal. As shown in FIG. 2, the method includes the following operations.

At block 201, the cloud server receives an upload request transmitted by the first terminal, wherein the upload request carries the account of the user and webpage information of a webpage displayed on a first browser of the first terminal.

At block 202, the cloud server transmits, according to the account, the webpage information of the webpage to the second terminal corresponding to the account, such that a second browser on the second terminal may open the webpage according to the webpage information.

In this example, the first terminal obtains the webpage information of the webpage displayed on the first browser and transmits the account and the webpage information of the webpage to the cloud server. The cloud server transmits the webpage information of the webpage to the second terminal corresponding to the account. The second terminal receives the webpage information of the webpage transmitted by the cloud server. Thus, the second browser on the second terminal can open the webpage according to the webpage information. As such, the user can browse the webpage on the second terminal directly according to the webpage information transmitted by the cloud server, which is convenient for the user to browse the webpage.

In the example as shown in FIG. 2, the webpage information includes at least link information of the webpage.

In addition, the upload request may be transmitted by the first terminal to the cloud server when the user issues an upload command to the first terminal. At this time, the cloud server may stores the account and the webpage information carried in the upload request after receiving the upload request transmitted by the first terminal, and may transmit the webpage information to the second terminal after receiving a synchronizing request from the second terminal.

Alternatively, if both the first terminal and the second terminal are online, i.e., both the first browser of the first terminal and the second browser of the second terminal are started, the upload request may be transmitted by the first terminal to the cloud server when the user adds/deletes a favorite item on a favorite bar of the first browser of the first terminal. At this time, the cloud server transmits the webpage information of the webpage corresponding to the favorite item added/deleted by the user to the second terminal after receiving the upload request. As such, the second browser of the second terminal may add/delete a favorite item on its favorite bar synchronously with the first browser.

Hereinafter, the above two implementation manners are described in further detail with reference to examples.

Figure 3:
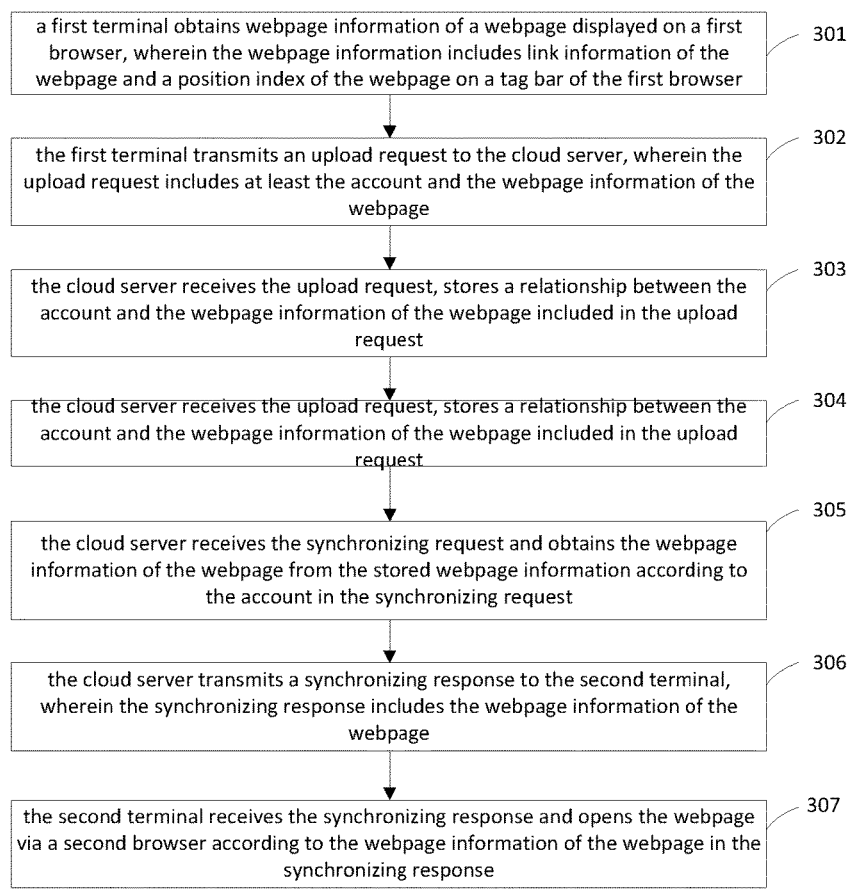
FIG. 3 is a flowchart illustrating a method for synchronizing webpage information according to an example of the present disclosure.

FIG. 3 is a flowchart illustrating a method for synchronizing webpage information according to a second example of the present disclosure. FIG. 3 is a simplified diagram according to one embodiment of the present invention. This diagram is merely an example, which should not unduly limit the scope of the claims. One of ordinary skill in the art would recognize many variations, alternatives, and modifications.

As shown in FIG. 3, the method includes the following operations.

At block 301, a first terminal obtains webpage information of a webpage displayed on a first browser, wherein the webpage information includes link information of the webpage and a position index of the webpage on a tag bar of the first browser.

The link information of the webpage includes at least a Uniform/Universal Resource Locator (URL) of the webpage. The link information of the webpage may further include information such as a title of the webpage.

When the webpage is opened by the first browser, contents of the webpage are displayed in a main window of the first browser. Meanwhile, a tag of the webpage is added in the tag bar of the first browser and a position index is configured for the tag of the webpage.

The user may trigger, through issuing an upload command, the first terminal to obtain the link information of the webpage and the position index of the webpage on the tag bar.

When the user closes the first browser, the first terminal may display a prompt window including contents "whether upload current browser status to the cloud". In addition, a "Yes" button and a "No" button may also be displayed. The user may click the "Yes" button to issue the upload command to the first terminal or click the "No" button to notify the first terminal that the user does not want to upload the webpage information of the webpage.

Besides the webpage information, the first terminal may also obtain navigation histories recorded by the first browser during a time period, e.g., between a first time and the current time. The first time may be the time that the first terminal uploads navigation histories last time, or the time that the first browser is opened this time. The navigation histories include link information of webpages opened during the time period and the time that the webpages were opened.

After obtaining the navigation histories recorded between the first time and the current time, the first terminal may update the first time with the current time. Therefore, next time when the first terminal obtains navigation histories, the navigation histories having been uploaded this time will not be obtained again.

The first terminal calls an interface of the first browser to read the navigation histories from the first browser.

At block 302, the first terminal transmits an upload request to the cloud server, wherein the upload request includes at least the account and the webpage information of the webpage.

In addition, the upload request may further include the navigation histories obtained by the first terminal.

At block 303, the cloud server receives the upload request, stores a relationship between the account and the webpage information of the webpage included in the upload request.

In particular, after receiving the upload request, the cloud server searches stored webpage information according to the account in the upload request. If there is webpage information of the webpage, the cloud server updates the stored webpage information of the webpage with the webpage information in the upload request. If there is no webpage information of the webpage, the cloud server stores a relationship between the account and the webpage information of the webpage.

In addition, if the upload request further includes the navigation histories, the cloud server records an upload time of the navigation histories, and stores a relationship between the account, the navigation histories and the upload time. The upload time may be the time that the cloud server receives the upload request.

At block 304, a second terminal transmits a synchronizing request to the cloud server, wherein the synchronizing request includes the account.

In addition, the synchronizing request may further include a second time that the second terminal transmits the synchronizing request last time.

At block 305, the cloud server receives the synchronizing request and obtains the webpage information of the webpage from the stored webpage information according to the account in the synchronizing request.

In addition, if the synchronizing request further includes the second time, the cloud server obtains navigation histories recorded between the second time and the current time from the navigation histories stored in the cloud server according to the account and the second time in the synchronizing request.

At block 306, the cloud server transmits a synchronizing response to the second terminal, wherein the synchronizing response includes the webpage information of the webpage.

In addition, if the synchronizing request transmitted by the second terminal contains the second time, the synchronizing response further includes the navigation histories recorded between the second time and the current time.

At block 307, the second terminal receives the synchronizing response and opens the webpage via a second browser according to the webpage information of the webpage in the synchronizing response.

In particular, the second terminal receives the synchronizing response including the webpage information of the webpage. The webpage information includes the link information of the webpage and the position index of the tag of the webpage on the tag bar. The second terminal controls the second browser to open the webpage according to the link information, and adds a tag of the webpage on the tag bar according to the position index of the webpage.

In addition, if the synchronizing response contains navigation histories, the second terminal transmits the navigation histories to a browser kernel of the second browser.

When the webpage is opened using the second browser, if the kernel of the second browser determines that there are navigation histories related to the webpage recorded before the webpage is opened, the second browser configures a "back" button of the second browser as usable. If the user clicks the "back" button, the webpage jumps to a webpage corresponding to the navigation histories.

When the webpage is opened using the second browser, if the kernel of the second browser determines that there are navigation histories related to the webpage recorded after the webpage is opened, the second browser configures a "forward" button of the second browser as usable. If the user clicks the "forward" button, the webpage jumps to a webpage corresponding to the navigation histories.

In this example, the first terminal and the second terminal may be the same terminal. At this time, the terminal may upload the navigation histories of the browser to the cloud server following blocks 301 to 303. At another time, the terminal may obtain the navigation histories of the browser from the cloud server according to blocks 304 to 307.

In this example, the first terminal may also transmit the webpage to the cloud server. Accordingly, the second terminal directly obtains the webpage from the cloud server according to the account.

In this example, the account may be a user name or a 2-dimensional code of the user name for logging on the cloud server.

In this example, the first terminal obtains the webpage information of the webpage displayed by the first browser and transmits the account and the webpage information of the webpage to the cloud server. The cloud server transmits the webpage information of the webpage to the second terminal according to the account. The second terminal receives the webpage information of the webpage transmitted by the cloud server and controls the second browser to open the webpage according to the webpage information of the webpage. As such, the user is able to browse the webpage using the second browser directly according to the webpage information, which is convenient for the user to browse the webpage.

Figure 4:
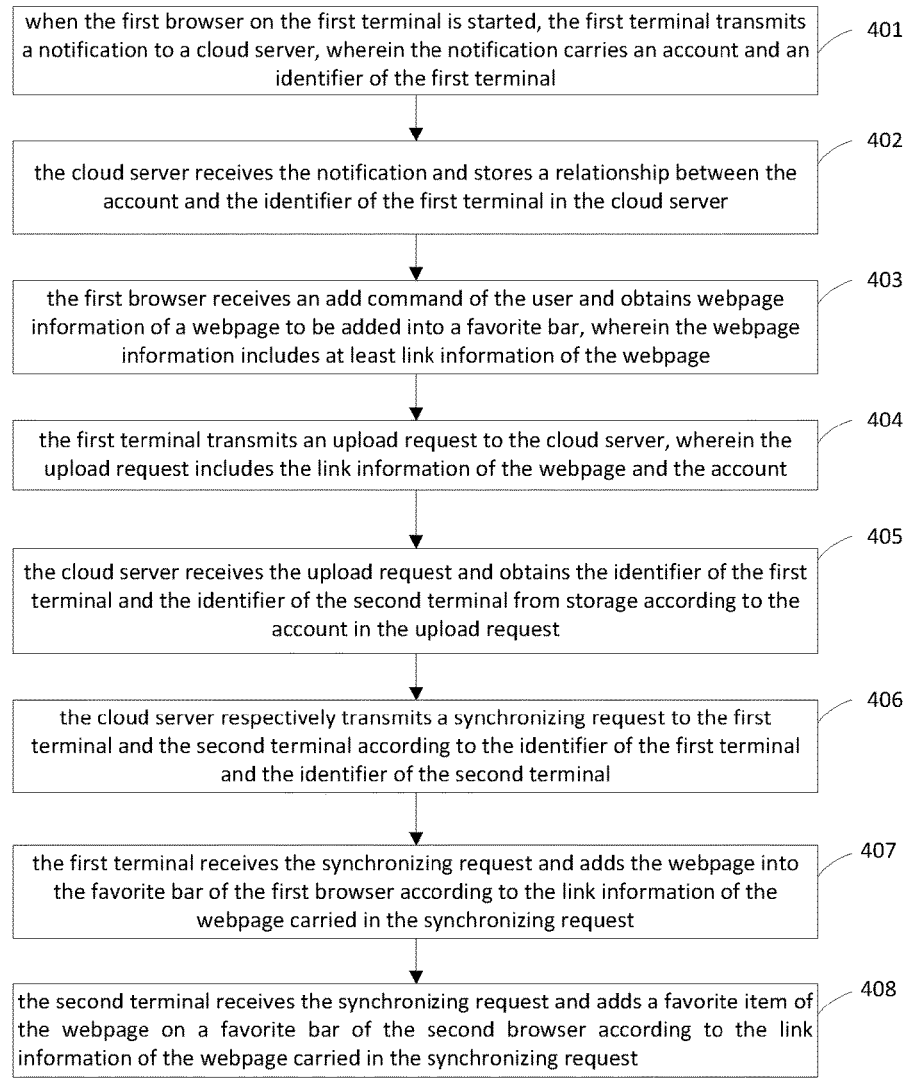
FIG. 4 is a flowchart illustrating a method for synchronizing webpage information according to an example of the present disclosure.

FIG. 4 is a flowchart illustrating a method for synchronizing webpage information according to an example of the present disclosure. FIG. 4 is a simplified diagram according to one embodiment of the present invention. This diagram is merely an example, which should not unduly limit the scope of the claims. One of ordinary skill in the art would recognize many variations, alternatives, and modifications.

In this example, both the first terminal and the second terminal are online, i.e., both the first browser of the first terminal and the second browser of the second terminal are started. The upload request may be transmitted by the first terminal to the cloud server when the user adds/deletes a favorite item on a favorite bar of the first browser of the first terminal. At this time, the cloud server transmits the webpage information of the webpage corresponding to the favorite item added/deleted by the user to the second terminal after receiving the upload request. As such, the second browser of the second terminal may add/delete a favorite item on its favorite bar synchronously with the first browser.

As shown in FIG. 4, the method includes the following operations.

At block 401, when the first browser on the first terminal is started, the first terminal transmits a notification to a cloud server, wherein the notification carries an account and an identifier of the first terminal.

Similarly, when the second browser in the second terminal is started, the second terminal transmits a notification carrying the account and an identifier of the second terminal to the cloud server.

At block 402, the cloud server receives the notification and stores a relationship between the account and the identifier of the first terminal in the cloud server.

Similarly, after receiving the notification transmitted by the second terminal, the cloud server also stores a relationship between the account and the identifier of the second terminal in the cloud server.

Through the above blocks 401 and 402, the cloud server identifies that the first terminal and the second terminal are online.

At block 403, the first browser receives an add command issued by the user and obtains webpage information of a webpage to be added to a favorite bar, wherein the webpage information includes at least link information of the webpage.

The user may select a webpage to be added to the favorite bar from webpages displayed by the first browser and issues the add command to the first browser.

The link information of the webpage may include a URL of the webpage.

At block 404, the first terminal transmits an upload request to the cloud server, wherein the upload request includes the webpage information of the webpage corresponding to the favorite item being added to the favorite bar and the account.

At block 405, the cloud server receives the upload request and obtains the identifier of the first terminal and the identifier of the second terminal from storage according to the account in the upload request.

At block 406, the cloud server respectively transmits a synchronizing request to the first terminal and the second terminal according to the identifier of the first terminal and the identifier of the second terminal. The synchronizing request carries the webpage information of the webpage.

At block 407, the first terminal receives the synchronizing request and adds the favorite item corresponding to the webpage to the favorite bar of the first browser according to the webpage information carried in the synchronizing request.

In particular, the first terminal receives the synchronizing request carrying the webpage information of the webpage, draws a blank favorite item on the favorite bar of the first browser and fills the link information of the webpage in the favorite item.

It should be noted that, after obtaining the link information of the webpage to be added to the favorite bar in block 303, the first terminal may directly add a favorite item on the favorite bar of the first browser according to the link information of the webpage.

At this time, after receiving the upload request of the first terminal in block 306, the cloud server obtains the identifier of the second terminal and transmits the synchronizing request to the second terminal according to the identifier of the second terminal.

At block 408, the second terminal receives the synchronizing request and adds a favorite item of the webpage on a favorite bar of the second browser according to the link information of the webpage carried in the synchronizing request.

In particular, the second terminal receives the synchronizing request carrying the webpage information, draws a blank favorite item on the favorite bar of the second browser and fills the link information of the webpage in the favorite item.

In the example of the present disclosure, the first terminal obtains the link information of the webpage to be added into the favorite bar, and transmits the account and the link information of the webpage to the cloud server. The cloud server transmits the link information of the webpage to the second terminal according to the account. The second terminal receives the link information of the webpage transmitted by the cloud server and adds the favorite item of the webpage on the favorite bar of the second browser according to the link information of the webpage. As such, when the user wants to browse the webpage on the second terminal, the user is able to open the webpage directly according to the favorite item of the webpage, which is convenient to browse the webpage.

Besides adding a webpage into the favorite bar, the user may also select a favorite item of a webpage on the first terminal and issue a deleting command to the first terminal to delete the favorite item of the webpage.

Figure 5:
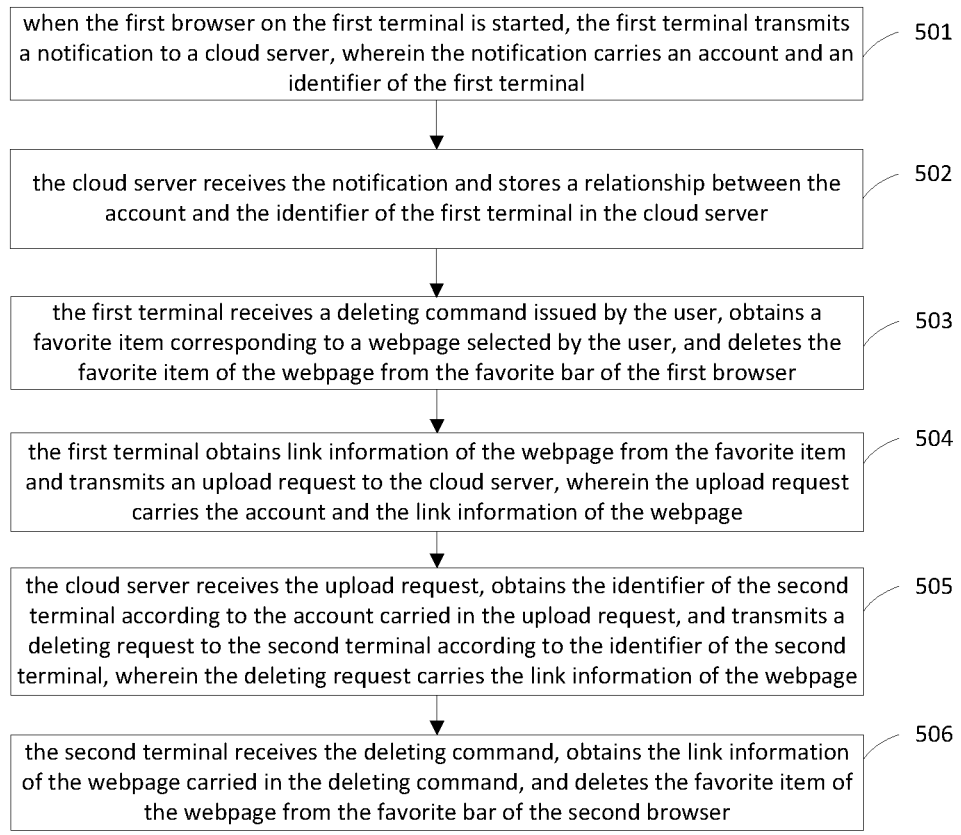
FIG. 5 is a flowchart illustrating a method for synchronizing webpage information according to an example of the present disclosure.

FIG. 5 is a flowchart illustrating a method for synchronizing webpage information according to an example of the present disclosure. FIG. 5 is a simplified diagram according to one embodiment of the present invention. This diagram is merely an example, which should not unduly limit the scope of the claims. One of ordinary skill in the art would recognize many variations, alternatives, and modifications.

As shown in FIG. 5, the method includes the following operations.

At block 501, when the first browser on the first terminal is started, the first terminal transmits a notification to a cloud server, wherein the notification carries an account and an identifier of the first terminal.

Similarly, when the second browser in the second terminal is started, the second terminal transmits a notification carrying the account and an identifier of the second terminal to the cloud server.

At block 502, the cloud server receives the notification and stores a relationship between the account and the identifier of the first terminal in the cloud server.

Similarly, after receiving the notification transmitted by the second terminal, the cloud server also stores a relationship between the account and the identifier of the second terminal in the cloud server.

Through the above blocks 501 and 502, the cloud server identifies that the first terminal and the second terminal are online.

At block 503, the first terminal receives a deleting command issued by the user, obtains a favorite item corresponding to a webpage selected by the user, and deletes the favorite item of the webpage from the favorite bar of the first browser.

At block 504, the first terminal obtains link information of the webpage from the favorite item and transmits an upload request to the cloud server, wherein the upload request carries the account and the link information of the webpage.

At block 505, the cloud server receives the upload request, obtains the identifier of the second terminal according to the account carried in the upload request, and transmits a deleting request to the second terminal according to the identifier of the second terminal, wherein the deleting request carries the link information of the webpage.

At block 506, the second terminal receives the deleting command, obtains the link information of the webpage carried in the deleting command, and deletes the favorite item of the webpage from the favorite bar of the second browser.

In the example of the present disclosure, the first terminal obtains the link information of the webpage to be deleted from the favorite bar, and transmits the account and the link information of the webpage to the cloud server via an upload request. The cloud server transmits the link information of the webpage to the second terminal according to the account. The second terminal receives the link information of the webpage transmitted by the cloud server and deletes the favorite item of the webpage on the favorite bar of the second browser according to the link information of the webpage. As such, the webpage information on the first terminal and that on the second terminal are synchronized.

In addition, in various examples of the present disclosure, when the first browser of the first terminal is closed, the first terminal transmits a close message carrying the account to the cloud server. The cloud server deletes the stored relationship between the account and the identifier of the first terminal. Thus, the cloud server identifies that the first terminal is not online.

When the second browser of the first terminal is closed, the second terminal transmits a close message carrying the account to the cloud server. The cloud server deletes the stored relationship between the account and the identifier of the second terminal. Thus, the cloud server identifies that the second terminal is not online.

In accordance with the above method, an example of the present disclosure further provides a user terminal which is able to execute the operations of the above described first terminal and second terminal.

Figure 6:
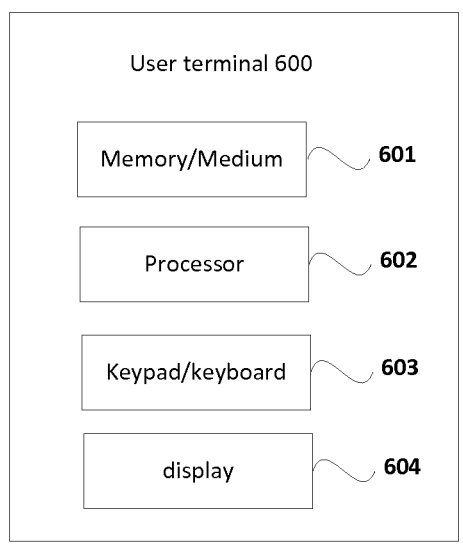
FIG. 6 is a schematic diagram illustrating a user terminal 600 according to an example of the present disclosure.

FIG. 6 is a schematic diagram illustrating an example of a user terminal 600 which may execute the method of the present disclosure. As shown in FIG. 6, the user terminal 600 may, for example, be a device such as a personal desktop computer or a portable device, such as a laptop computer, a tablet computer, a cellular telephone, or a smart phone.

For example, the user terminal 600 may include one or more non-transitory processor-readable storage media 601 and one or more processors 602 in communication with the non-transitory processor-readable storage media 601. The user terminal 600 may further include a keypad/keyboard 603 and a display 604, as shown in FIG. 6.

The non-transitory processor-readable storage media 601 may be a RAM memory, flash memory, ROM memory, EPROM memory, EEPROM memory, registers, hard disk, a removable disk, a CD-ROM, or any other form of non-transitory storage medium known in the art. The one or more non-transitory processor-readable storage media 601 may store sets of instructions, or units and/or modules that comprise the sets of instructions, for conducting operations described in the present application. The one or more processors 602 may be configured to execute the sets of instructions and perform the operations in examples of the present application.

In this example, the user logs on a cloud server via two user terminals 600 using the same account, so as to synchronize webpage information between the two terminals 600. Hereinafter, the two user terminals 600 are referred to as a first terminal and a second terminal. It should be noted that both the first terminal and the second terminal may be implemented according to the example shown in FIG. 6, and the first terminal and the second terminal may be the same terminal.

In particular, the one or more processors 602 of the first terminal may be configured to execute the sets of instructions to perform the following operations:

transmit an upload request to a cloud server, wherein the upload request includes an account and webpage information of a first webpage displayed on the first browser of the first terminal, such that the cloud server transmits the webpage information of the first webpage to the second terminal according to the account and the second browser of the second terminal opens the first webpage according to the webpage information.

In one example, the upload request may further include navigation histories recorded by the first browser. At this time, before transmitting the upload request to the cloud server, the first terminal obtains the navigation histories recorded between a first time and a current time; wherein the first time is a time when the first terminal obtains the navigation histories last time. After obtaining the navigation histories recorded between the first time and the current time, the first terminal updates the first time with the current time.

In one example, before transmitting the upload request to the cloud server, the first terminal transmits a notification carrying the account and an identifier of the first terminal to the cloud server, such that the cloud server stores a first relationship between the account and the identifier of the first terminal, wherein the cloud server further stores a second relationship between the account and an identifier of the second terminal. Thus, the cloud server identifies that the first terminal is online.

The upload request may be transmitted by the first terminal when a favorite item corresponding to the first webpage is added on a favorite bar of the first browser. In response to the upload request transmitted by the first terminal, the cloud server obtains the identifier of the second terminal and transmits webpage information to the second terminal, such that the second terminal adds a favorite item on a favorite bar of the second browser according to the webpage information.

The upload request may be transmitted by the first terminal when a favorite item corresponding to the first webpage is deleted from a favorite bar of the first browser. In response to the upload request transmitted by the first terminal, the cloud server obtains the identifier of the second terminal and transmits webpage information to the second terminal, such that the second terminal deletes a favorite item from a favorite bar of the second browser according to the webpage information.

The one or more processors 602 of the first terminal may be configured to execute the sets of instructions to perform the following operations:

transmit a synchronizing request carrying the account to the cloud server; and receive webpage information of a second webpage transmitted by the cloud server, such that the first browser of the first terminal opens the second webpage according to the webpage information.

What has been described and illustrated herein is a preferred example of the disclosure along with some of its variations. The terms, descriptions and figures used herein are set forth by way of illustration only and are not meant as limitations. Many variations are possible within the spirit and scope of the disclosure, which is intended to be defined by the following claims—and their equivalents—in which all terms are meant in their broadest reasonable sense unless otherwise indicated.

The invention claimed is:

1. A method for synchronizing webpage information between a first terminal and a second terminal which use a same account, comprising:

receiving, by a cloud server, an upload request transmitted by the first terminal, wherein the upload request comprises:
an account associated with the first and second terminals;
webpage information of a webpage displayed on a first browser of the first terminal; and
navigation histories associated with the webpage recorded by the first browser spanning from a previous upload time to an upload time of the upload request; and storing, by the cloud server, a first relationship between the webpage information of the webpage and the account in the cloud server;

recording, by the cloud server, the upload time of the navigation histories;

storing, by the cloud server, a second relationship between the navigation histories, the upload time, and the account in the cloud server;

obtaining, by the cloud server, the webpage information and the navigation histories corresponding to the account according to the first relationship and the second relationship stored in the cloud server; and without receiving any request from the second terminal, transmitting, by the cloud server, the webpage information of the webpage and the navigation histories to the second terminal after the obtaining, such that a second browser of the second terminal opens the webpage according to the webpage information, wherein the second browser enables, according to the navigation histories, at least one back and/or forward button for navigating away from the webpage to a different webpage included in the navigation histories.

2. The method of claim 1, wherein before receiving the upload request, the method further comprises:

receiving, by the cloud server, a first notification message transmitted by the first terminal when the first browser is opened on the first terminal, wherein the upload request carries the account and an identifier of the first terminal;

storing, by the cloud server, a third relationship between the account and the identifier of the first terminal in the cloud server;

receiving, by the cloud server, a second notification message transmitted by the second terminal when the second browser is opened on the second terminal, wherein the upload request carries the account and an identifier of the second terminal; and storing, by the cloud server, a fourth relationship between the account and the identifier of the second terminal in the cloud server.

3. The method of claim 2, wherein:

the upload request is transmitted by the first terminal when a favorite item corresponding to the webpage is added on a favorite bar the first browser; and transmitting the webpage information of the webpage to the second terminal according to the account comprises:
obtaining, by the cloud server, the identifier of the second terminal according to the fourth relationship and the account carried in the upload request;
transmitting, by the cloud server, a synchronizing request to the second terminal according to the identifier of the second terminal, wherein the synchronizing request carries the webpage information of the webpage; such that the second terminal adds a favorite item on a favorite bar of the second browser according to the webpage information.

4. The method of claim 2, wherein:

the upload request is transmitted by the first terminal when a favorite item corresponding to the webpage is deleted from a favorite bar the first browser; and transmitting the webpage information of the webpage to the second terminal according to the account comprises:
obtaining, by the cloud server, the identifier of the second terminal according to the fourth relationship and the account carried in the upload request;
transmitting, by the cloud server, a synchronizing request to the second terminal according to the identifier of the second terminal, wherein the synchronizing request carries the webpage information of the webpage; such that the second terminal deletes a favorite item from a favorite bar of the second browser according to the webpage information.

5. The method of claim 1, wherein:

the webpage information comprises a position index of the webpage in a tag bar of the first browser; and the second terminal adds a tag of the webpage to a tag bar of the second browser according to the position index of the webpage.

6. The method of claim 1, wherein the at least one back and/or forward button is enabled after the webpage is opened in the second browser.

7. A cloud server for synchronizing webpage information between a first terminal and a second terminal which use a same account, the cloud server comprising: a processor and a memory; wherein the memory is communicatively connected with the processor and stores machine-readable instructions executable by the processor to:

receive an upload request transmitted by the first terminal, wherein the upload request comprises:
an account associated with the first and second terminals;
webpage information of a webpage displayed on a first browser of the first terminal; and
navigation histories associated with the webpage recorded by the first browser spanning from a previous upload time to an upload time of the upload request;

store a first relationship between the webpage information of the webpage and the account in the cloud server;

record the upload time of the navigation histories;
store a second relationship between the navigation histories, the upload time and the account in the cloud server;
obtain the webpage information and the navigation histories corresponding to the account according to the first relationship and the second relationship stored in the cloud server; and
without receiving any request from the second terminal, transmit the webpage information of the webpage and the navigation histories to the second terminal after the obtaining, such that a second browser of the second terminal opens the webpage according to the webpage information, wherein the second browser enables, according to the navigation histories, at least one back and/or forward button for navigating away from the webpage to a different webpage included in the navigation histories.

8. The cloud server of claim 7, wherein the memory further stores machine-readable instructions executable by the processor to, before receiving the upload request:
receive a first notification message transmitted by the first terminal when the first browser is opened on the first terminal, wherein the upload request carries the account and an identifier of the first terminal;
store a third relationship between the account and the identifier of the first terminal in the cloud server;
receive a second notification message transmitted by the second terminal when the second browser is opened on the second terminal, wherein the upload request carries the account and an identifier of the second terminal; and
store a fourth relationship between the account and the identifier of the second terminal in the cloud server.

9. The cloud server of claim 8, wherein:
the upload request is transmitted by the first terminal when a favorite item corresponding to the webpage is added on a favorite bar of the first browser; and
the memory further stores machine-readable instructions executable by the processor to:
obtain the identifier of the second terminal according to the fourth relationship and the account carried in the upload request;
transmit a synchronizing request to the second terminal according to the identifier of the second terminal, wherein the synchronizing request carries the webpage information of the webpage; such that the second terminal adds a favorite item on a favorite bar of the second browser according to the webpage information.

10. The cloud server of claim 8, wherein:
the upload request is transmitted by the first terminal when a favorite item corresponding to the webpage is deleted from a favorite bar of the first browser; and
the memory further stores machine-readable instructions executable by the processor to:
obtain the identifier of the second terminal according to the fourth relationship and the account carried in the upload request;
transmit a synchronizing request to the second terminal according to the identifier of the second terminal, wherein the synchronizing request carries the webpage information of the webpage; such that the second terminal deletes a favorite item on a favorite bar of the second browser according to the webpage information.

11. A non-transitory computer-readable storage medium comprising a set of instructions for synchronizing webpage information between a first terminal and a second terminal which use a same account, the set of instructions to direct at least one processor to perform acts of:
receiving, by a cloud server, an upload request transmitted by the first terminal, wherein the upload request comprises:
an account associated with the first and second terminals;
webpage information of a webpage displayed on a first browser of the first terminal; and
navigation histories associated with the webpage recorded by the first browser spanning from a previous upload time to an upload time of the upload request; and
storing, by the cloud server, a first relationship between the webpage information of the webpage and the account in the cloud server;
recording, by the cloud server, the upload time of the navigation histories;
storing, by the cloud server, a second relationship between the navigation histories, the upload time, and the account in the cloud server;
obtaining, by the cloud server, the webpage information and the navigation histories corresponding to the account according to the first relationship and the second relationship stored in the cloud server; and
without receiving any request from the second terminal, transmitting, by the cloud server, the webpage information of the webpage and the navigation histories to the second terminal after the obtaining, such that a second browser of the second terminal opens the webpage according to the webpage information, wherein the second browser enables, according to the navigation histories, at least one back and/or forward button for navigating away from the webpage to a different webpage included in the navigation histories.

12. The non-transitory computer-readable storage medium of claim 11, wherein before receiving the upload request, the set of instructions further direct the at least one processor to perform acts of:
receiving, by the cloud server, a first notification message transmitted by the first terminal when the first browser is opened on the first terminal, wherein the upload request carries the account and an identifier of the first terminal;
storing, by the cloud server, a third relationship between the account and the identifier of the first terminal in the cloud server;
receiving, by the cloud server, a second notification message transmitted by the second terminal when the second browser is opened on the second terminal, wherein the upload request carries the account and an identifier of the second terminal; and
storing, by the cloud server, a fourth relationship between the account and the identifier of the second terminal in the cloud server.

13. The non-transitory computer-readable storage medium of claim 12, wherein:
the upload request is transmitted by the first terminal when a favorite item corresponding to the webpage is added on a favorite bar the first browser; and
transmitting the webpage information of the webpage to the second terminal according to the account comprises:

obtaining, by the cloud server, the identifier of the second terminal according to the fourth relationship and the account carried in the upload request;

transmitting, by the cloud server, a synchronizing request to the second terminal according to the identifier of the second terminal, wherein the synchronizing request carries the webpage information of the webpage; such that the second terminal adds a favorite item on a favorite bar of the second browser according to the webpage information.

14. The non-transitory computer-readable storage medium of claim 12, wherein:

the upload request is transmitted by the first terminal when a favorite item corresponding to the webpage is deleted from a favorite bar the first browser; and transmitting the webpage information of the webpage to the second terminal according to the account comprises:

obtaining, by the cloud server, the identifier of the second terminal according to the fourth relationship and the account carried in the upload request;

transmitting, by the cloud server, a synchronizing request to the second terminal according to the identifier of the second terminal, wherein the synchronizing request carries the webpage information of the webpage; such that the second terminal deletes a favorite item from a favorite bar of the second browser according to the webpage information.

\* \* \* \* \*